United States Patent
Guey et al.

(10) Patent No.: US 8,303,256 B2
(45) Date of Patent: Nov. 6, 2012

(54) BLADE PITCH DRIVING APPARATUS FOR WIND DRIVEN GENERATOR

(75) Inventors: Zen-Jey Guey, Hsinchu (TW); Chien-Chiang Tung, Changhua (TW); Yun-Yuan Chang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 892 days.

(21) Appl. No.: 12/330,221

(22) Filed: Dec. 8, 2008

(65) Prior Publication Data

US 2009/0155075 A1 Jun. 18, 2009

(30) Foreign Application Priority Data

Dec. 14, 2007 (TW) ................ 96148070 A
Oct. 17, 2008 (TW) ................ 97140081 A

(51) Int. Cl.
*F03D 7/00* (2006.01)
*F01D 7/00* (2006.01)

(52) U.S. Cl. .............. 416/147; 416/132 B; 416/162; 416/155; 416/156

(58) Field of Classification Search .......... 416/132 B, 416/147, 155, 156, 162
See application file for complete search history.

(56) References Cited

U.S. PATENT DOCUMENTS

| | | | |
|---|---|---|---|
| 5,281,094 A * | 1/1994 | McCarty et al. | 416/147 |
| 5,365,153 A * | 11/1994 | Fujita et al. | 318/34 |
| 6,304,002 B1 | 10/2001 | Dehlsen et al. | |
| 6,783,326 B2 | 8/2004 | Weitkamp et al. | |
| 2006/0083615 A1 | 4/2006 | Rogall et al. | |
| 2008/0129050 A1 * | 6/2008 | Guey et al. | 290/43 |
| 2009/0134624 A1 * | 5/2009 | Kerber | 290/44 |
| 2011/0046802 A1 * | 2/2011 | Jones et al. | 700/287 |

FOREIGN PATENT DOCUMENTS

| | | |
|---|---|---|
| AU | 2003267035 | 3/2005 |
| CN | 1782369 A | 6/2006 |
| CN | 1860292 A | 2/2007 |
| DE | 101 16 011 A1 | 5/2002 |
| DE | 101 40 793 A1 | 3/2003 |
| EP | 1 286 048 A1 | 2/2003 |
| EP | 1 647 708 A1 | 4/2006 |
| EP | 1 664 527 B1 | 2/2007 |
| JP | 09-060575 | 3/1997 |
| JP | 2003222070 | 8/2003 |
| JP | 2007239599 | 9/2007 |

* cited by examiner

*Primary Examiner* — Matthew W Such
*Assistant Examiner* — David Spalla
(74) *Attorney, Agent, or Firm* — Apex Juris, pllc; Tracy M. Heims

(57) ABSTRACT

A blade pitch driving apparatus of a wind-driven generator and a driving method therefor are adapted to receive an external electrical power and impel a blade toward a corresponding pitch angle according to a pitch command. The apparatus includes an UPS, a permanent magnet synchronous motor drive (PMSM drive), an AC pitch motor (ACPM) and a hub controller. The hub controller normally switches the external power to the PMSM drive, receives the pitch command and control the ACPM to impel the blade toward the corresponding pitch angle. When the PMSM drive fails or the external electrical power is interrupted, the hub controller switches the electrical power of the UPS to the ACPM and controls the blade being impelled toward a feathered position.

13 Claims, 5 Drawing Sheets

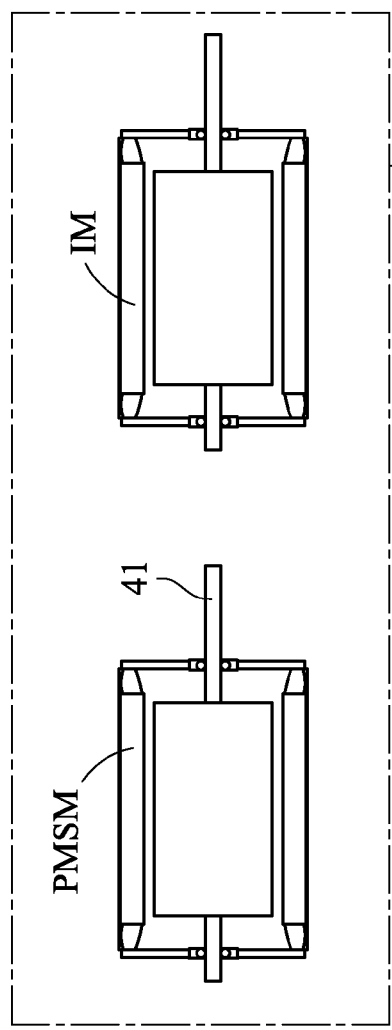
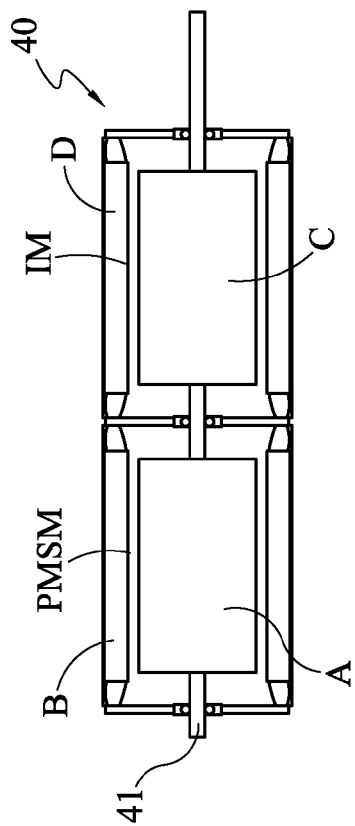

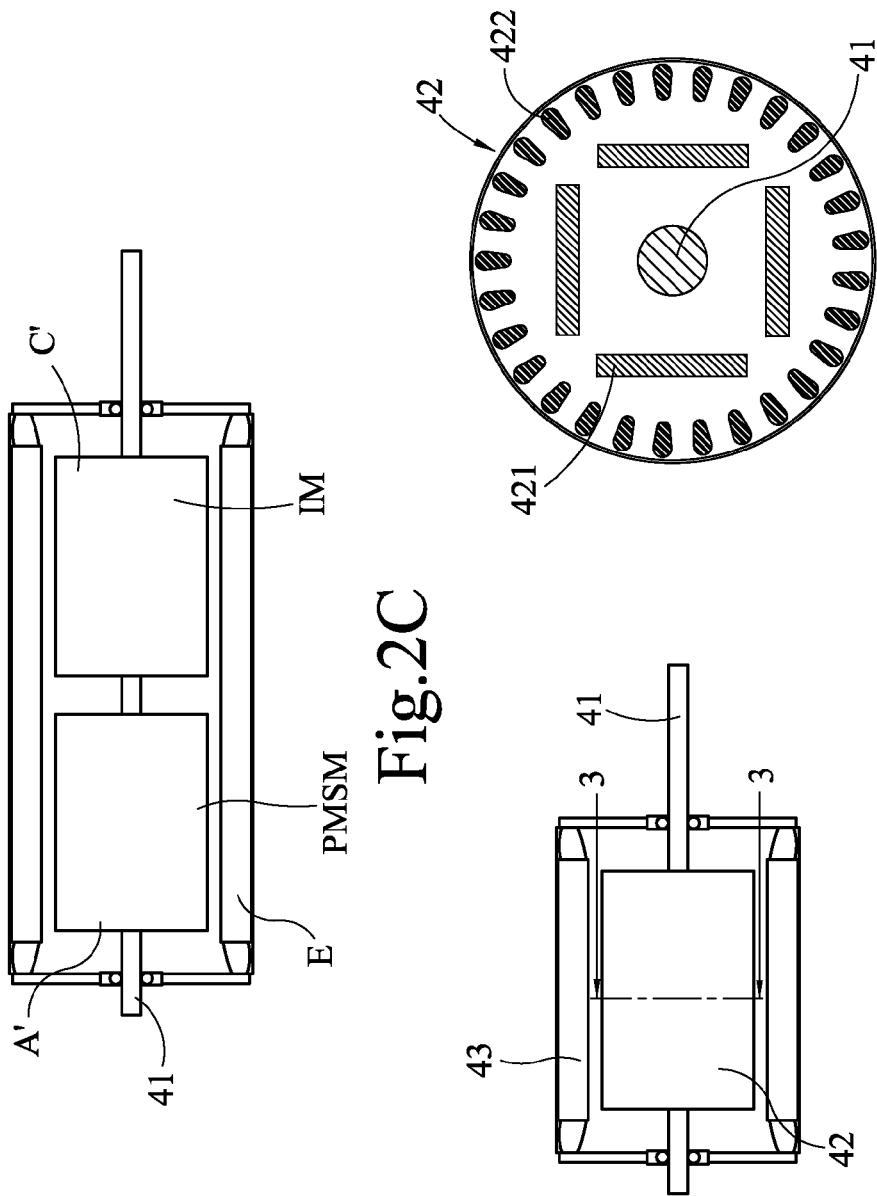

BLADE PITCH DRIVING APPARATUS FOR WIND DRIVEN GENERATOR

CROSS-REFERENCE TO RELATED APPLICATIONS

This non-provisional application claims priority under 35 U.S.C. §119(a) on Patent Application No(s). 096148070 and 097140081 respectively filed in Taiwan, R.O.C. on Dec. 14, 2007 and Oct. 17, 2008 the entire contents of which are hereby incorporated by reference.

BACKGROUND OF THE INVENTION

1. Field of Invention

The invention relates to a driving apparatus for a wind-driven generator. More particularly, the invention relates to a pitch driving apparatus used to adjust the pitch angle of the blade of a wind-driven generator.

2. Related Art

During the recent years, the output power of a wind driven generator has been increased to more than 5000 kW, and the length of the blade and tower height are extended over tens of meters. These factors contribute to an increased challenge in maintenance and a higher cost of the system. On the other hand, to reduce the cost of power generation and ensure the operational profit, the service life of a large wind driven generator is usually designed to be 20 years, requiring an extremely high reliability of parts or subsystems.

Currently, a large variable speed wind-driven generator usually adopts a variable speed generator with pitch adjustment mechanism to adjust the blade for limiting the wind energy obtained by the wind driven-generator, so as to control the output power of the wind-driven generator. The pitch adjustment mechanism may be a hydraulic system or an electric system, and hereinafter we refer only to the electric one and is termed as pitch drive. The pitch drive includes a pitch motor and a motor drive. The pitch drive is configured in a rotating hub and coupled to a corresponding blade through a reduction gear box. Thus, the pitch angle of the blade is adjusted by the pitch motor.

When the wind speed is between a rated wind speed and a cut-out speed, the pitch drive must adjust the pitch angle of the blade timely and accurately to limit the output power of the wind-driven generator to a rated value. When the wind speed exceeds the cut-out speed, the pitch drive adjusts the pitch angle of the blade to a position of 90° (also referred to as a feathered position) to prevent the wind-driven generator from being damaged by the strong wind. Therefore, the pitch drive is a critical subsystem in the variable speed wind-driven generator significantly. The output performance and the security of the wind-driven generator mostly rely on the configuration of the pitch drive. Because the blade of the large wind-driven generator can be hit by lightning, and the wind speed changes at any time, the pitch drive is usually in a load state with large variation. Thus, the failure of the pitch drive cannot be completely avoided and it is usually required that the pitch drive should have a redundancy design for consideration of the system reliability. The redundancy design enables the blade to rotate back to a feathered position (usually 90°) when the pitch drive fails, such that the wind-driven generator is in a minimum load state until being recovered.

The conventional pitch drive usually adopts a DC motor to serve as the pitch motor. This is because the DC motor has excellent servo control performance and in addition, once the pitch drive fails, the DC motor can impel the blade to rotate to the feathered position by using the power of a backup battery and hence meet the redundancy requirement easily.

European patent publication No. EP1664527 (also published as AU2003267035 and CN1860292) discloses the most typical redundancy design which has one more set of pitch drive installed in the hub as the redundant pitch drive. When the pitch drive fails, the redundant pitch drive replaces the failed one to maintain the continuous operation of the system.

Germany patent publication No. DE10116011 discloses a redundancy design having several pitch drives (for example three). Each pitch drive impels one motor to drive the same blade to rotate. As long as one of the drivers or motors fails, the remaining drivers drive the blade to a predetermined pitch angle (pitch position). Then the generator is shut down for reparation. The similar redundancy design of using more than two motors to drive the same blade to rotate has been published in Germany patent DE10140793 (patent family: EP1286048 and U.S. Pat. No. 6,783,326), and EP1647708 (patent family: US2006083615 and CN1782369). In EP1647708, in addition to a driving apparatus in which two motors (including drivers) are coupled with a reduction gear box, a spring transmission apparatus is added to provide assistant torque.

The most prior art adopts a DC motor as the one of the core elements of the blade pitch drive. Regular examination and reparation are required for maintaining the commutators and brushes of the DC motor. The heat dissipation is a concern in the DC motor because its armature winding is located on a rotation portion. Further, no ventilating or cooling system is disposed in the wind generator hub. Under heavy load conditions, accordingly the winding is easily overheated and the pitch motor might be therefore burnt out. In view of the above-mentioned disadvantages of the DC motor applied to a large scale wind-driven generator, the operation maintenance requirement and cost are relatively high. Although the above-mentioned published European patent EP1664527 adopts an AC motor, the similar redundancy design still has large complication or higher fabrication cost, and requires more backup batteries.

SUMMARY OF THE INVENTION

The invention is to provide a blade pitch driving apparatus and a driving method for a wind-driven generator having redundancy and better performance. According to one embodiment of the invention, the driving apparatus is adapted to receive an external electrical power and impel a corresponding blade to a corresponding pitch angle according to a pitch command. The driving apparatus comprises an uninterruptible power supply (UPS) for providing an uninterruptible electrical power, a permanent magnet synchronous motor drive (PMSM drive) for receiving the external electrical power to produce a driving electrical power, an alternating current pitch motor (ACPM) for receiving the uninterruptible electrical power or the driving electrical power to produce a rotary power, a reduction gear box for receiving the rotary power to impel the corresponding blade to change the pitch angle of the blade and a hub controller. The hub controller receives and processes the pitch command. The PMSM drive receives the processed command and impels the blade to the corresponding pitch angle according to the processed command through the ACPM and the reduction gear box. When the PMSM drive fails or the external electrical power is interrupted, the hub controller switches the uninterruptible electrical power to the ACPM and controls the blade toward a feathered position through the ACPM and the reduction gear box.

The ACPM comprises a PMSM, an induction motor (IM) and a common rotation shaft. The PMSM receives the external electrical power and produces the rotary power to the common rotation shaft. The IM receives the uninterruptible electrical power and produces the rotary power to the common rotation shaft.

According to one embodiment of the ACPM of the present invention, the PMSM and the IM has respective rotors and respective coils. According to another embodiment of the ACPM of the present invention, the PMSM and the IM have respective rotors and a common coil. According to the third embodiment of the ACPM of the present invention, the ACPM comprises a rotation shaft, an ACPM rotor around the rotation shaft and a coil around the ACPM rotor. The ACPM rotor comprises a permanent magnet around the rotation shaft and a plurality of short circuit conductors around the permanent magnet.

The driving apparatus further comprises a first relay and a second relay. The first relay is disposed on an output end of the PMSM drive and controlled by the hub controller. The second relay is disposed between the AC bus and the ACPM. When the PMSM drive fails or the external electrical power is interrupted, the hub controller disconnects the PMSM drive from the ACPM through the first relay, connects the uninterruptible electrical power with the ACPM through the second relay and controls the blade toward the feathered position.

The UPS is an offline UPS and can provide a back-up three-phase AC power during electricity interruption. When the PMSM drive fails or the external electrical power is interrupted, the hub controller switches the three-phase AC power to the ACPM through an AC bus for impelling the blade toward the feathered pitch.

The apparatus further comprises a position sensor, a brake, and a limit switch disposed on the rotation shaft of the ACPM. The position sensor senses the current pitch angle of the blade. When the blade reaches the feathered position, the limit switch is triggered. The hub controller actuates the brake to fix the blade and disconnects the AC bus from the ACPM through the second relay.

According to another embodiment of the present invention, the blade pitch driving method comprises the steps of connecting an external electrical power with the PMSM drive, so that the ACPM impels the blade toward a predetermined pitch angle; and connecting an uninterruptible electrical power with the ACPM to impel the blade toward a feathered position when the PMSM drive fails or the external electrical power is interrupted.

The driving method further comprises the step of disconnecting the external electrical power from the PMSM drive when the PMSM drive fails or the external electrical power is interrupted.

In consequence, the present invention utilizes an ACPM instead of a DC motor, no carbon brush or commutator is required. Additionally, the ACPM is selectively connected with the external electrical power (driving electrical power from PMSM drive) or the uninterruptible electrical power. Accordingly, the present invention has satisfactory redundancy design, simplified structure and lower fabrication cost.

BRIEF DESCRIPTION OF THE DRAWINGS

The invention will become more fully understood from the detailed description given herein below for illustration only, and thus are not limitative of the invention, and wherein:

FIG. 2A is a schematic view of the AC pitch motor according to the first embodiment of the invention;

FIG. 2B is a schematic view of the AC pitch motor according to the first embodiment of the invention;

FIG. 2C is a schematic view of the AC pitch motor according to the second embodiment of the invention;

FIG. 2D is a schematic view of the AC pitch motor according to the third embodiment of the invention;

FIG. 3 is a cross-sectional view of the structure of the rotor of the AC pitch motor in FIG. 2D according to the third embodiment of the invention;

DETAILED DESCRIPTION OF THE INVENTION

The embodiments given below in the invention are only used to illustrate the objectives and the preferred embodiments of the invention, and are not used to limit the scope of the invention.

Figure 1:
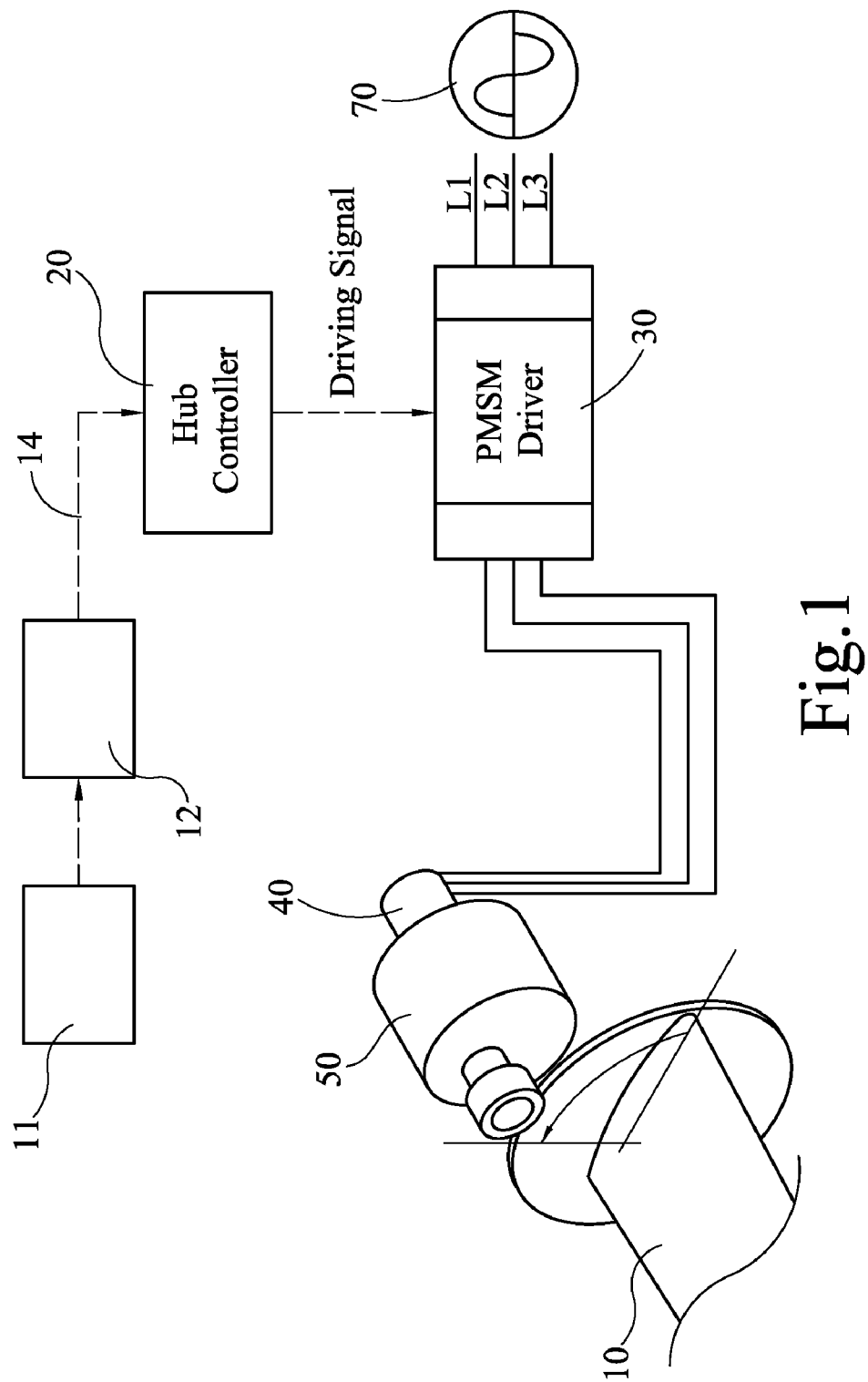
FIG. 1 is a schematic view of the blade pitch driving apparatus applied to a wind-driven generator according to one embodiment of the invention.

In general, a wind-driven generator usually has three blades (or less than or more than three blades), and a blade pitch driving apparatus is installed in a hub of the wind-driven generator, for driving a corresponding blade 10 to rotate to a predetermined blade pitch. An anemometer 11 and a central control part 12 (see FIG. 1) are provided in a nacelle of the wind-driven generator. The central control part 12 determines the pitch of the blade according to a current wind speed, and sends a pitch command 14 to the blade pitch driving apparatus, for driving the blade 10 to rotate to a corresponding pitch position in accordance with the pitch command 14.

According to one embodiment of the invention, a suit of corresponding blade pitch driving apparatus is provided for each blade 10 of the wind-driven generator. In the following description of the embodiment of the invention, the blade pitch driving apparatus installed on a single blade 10 is an example for illustration.

Referring to FIG. 1 again, the blade pitch driving apparatus according to a embodiment of the invention is provided, and the blade pitch driving apparatus includes a hub controller 20, an alternating current pitch motor (hereafter referred to ACPM) 40, a reduction gear box 50, and a permanent magnet synchronous motor (PMSM) drive 30 (referred to as the PMSM drive 30 hereinafter). The ACPM can be also named permanent magnet induction synchronous motor (PMISM). The PMSM drive 30 can be but not limited to an AC PMSM drive.

The hub controller 20 is capable of receiving the pitch command 14, processing the pitch command 14 into a driving signal, and then transmitting the driving signal to the AC permanent magnet synchronous motor (PMSM) drive 30 corresponding to the blade 10.

The ACPM 40, corresponding to each blade 10, provides a rotary power used to adjust the pitch angle of the blade.

The reduction gear box 50 is coupled with a rotation shaft of the AC pitch motor 40 to drive the blade 10 to change the pitch angle of the blade. The reduction gear box 50 can be, but not limited to, a reduction gear mechanism.

The PMSM drive 30 corresponds to each blade 10 and can be an AC PMSM drive. An external electrical power 70 is a three-phase AC power (L1, L2 and L3) and connected with the PMSM driver 30. The PMSM driver 30 receives the driving signal (processed command) from the hub controller 20 to perform a field oriented control or vector control on the ACPM 40, so as to impel the AC pitch motor 40 to drive the corresponding blade 10 to rotate to a corresponding pitch angle (or called as a corresponding pitch position).

In view of the problems of the conventional pitch driving mechanism such as overheated burnout, maintenance requirement, and higher cost because of the using of the DC motor, in the embodiment of the invention, the AC pitch motor 40 is utilized in the blade pitch driving apparatus for a wind-driven generator. Please referring to FIG. 2A, the ACPM 40 provided by the invention can be considered as a combination of the PMSM and the induction motor (IM) sharing the same rotation shaft 41 in principle. FIG. 2B is a first embodiment of the AC pitch motor, wherein the PMSM has a rotor A (mainly a permanent magnet) and a coil B wound around the rotor A, and the IM also has a rotor C (mainly cast aluminum) and a coil D disposed on a periphery of the rotor C. In other words, the PMSM and the IM have respective rotors A, C, and respective coils B, D, but the rotors A, C share the same rotation shaft 41.

FIG. 2C is the second embodiment of the AC pitch motor of the invention. The AC pitch motor includes two rotors, which are a rotor A' of the PMSM and a rotor C' of the IM, a single coil E, and a single rotation shaft 41. In other words, the rotor A' and the rotor C' share the same rotation shaft 41 and the same coil E. The PMSM and IM have respective rotors A', C' and a common coil E. FIG. 2D is the third embodiment of the AC pitch motor of the invention. The AC pitch motor includes a ACPM rotor 42, a rotation shaft 41, and a coil 43 wound around the ACPM rotor 42. Please referring to FIG. 3, a cross-sectional view of the AC pitch motor rotor, the ACPM rotor 42 includes a permanent magnet 421 wound around the rotation shaft 41, and a plurality of short circuit conductors 422 wound around the permanent magnet 421. The short circuit conductors are, for example but not limited to, cast aluminum bars. Therefore only the single coil 43 and the single rotation shaft 41 are required to have the characteristics of the PMSM and the IM. Because there is no carbon brush or commutator design, and the three-phase AC power is used as the power supply, thus the problems resulted from the using of the DC motor are avoided or much reduced.

Another embodiment of the ACPM rotor 42 which is equivalent to the ACPM rotor 42 in FIG. 2D comprises a permanent magnet disposed inside the rotation shaft and a plurality of short circuit conductors disposed around the rotation shaft. This embodiment of the ACPM rotor 42 can be adapted to the AC pitch motor of FIG. 2D to achieve the above functions.

In a normal operation state, the PMSM driver 30 is used to execute a vector control and to perform a close loop position control on the AC pitch motor 40, so as to accurately and quickly adjust the pitch angle of the blade 10 according to the pitch command 14 of the central control part 12 of the wind-driven generator. At this time, the PMSM driver 30 performs the field oriented control according to the position of the permanent magnet 421 of the AC pitch motor rotor 42, and has an output current whose fundamental frequency is synchronous with the rotation speed of the AC pitch motor rotor 42. Thus the rotation speed of the AC pitch motor 40 is of zero slip, so in principle the characteristics of the IM will not appear.

Figure 4:
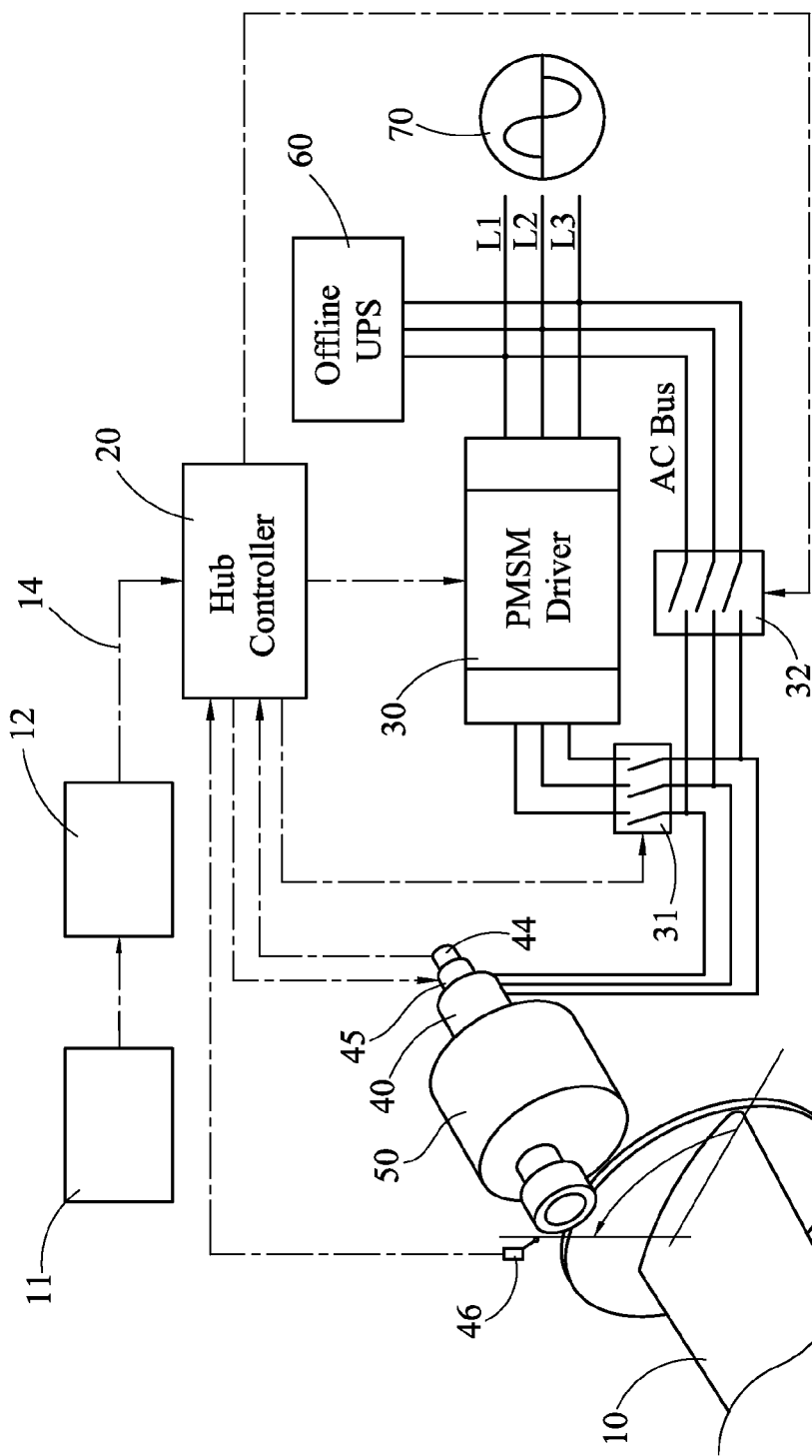
FIG. 4 is the structure of the redundancy design of the blade pitch driving apparatus according to one embodiment of the invention.

Referring to FIG. 4, another embodiment of the redundancy design of the blade pitch driving apparatus of the invention is shown. The driving apparatus is adapted to receive an external electrical power 70 and impel a blade 10 to a corresponding blade pitch according to a pitch command 14. The driving apparatus includes an uninterruptible power supply 60 (hereafter referred to UPS), a PMSM drive 30, an ACPM 40, a reduction gear box 50 and a hub controller 20.

The UPS 60 provides an uninterruptible electrical power. The PMSM drive 30 receives the external electrical power 70 to produce a driving electrical power. The ACPM 40 selectively receives the uninterruptible electrical power or the driving electrical power to produce a rotary power. The reduction gear box 50 receives the rotary power and impels the blade to change the pitch of the blade.

The hub controller 20 receives and processes the pitch command 14 from the central control part 12 of the engine room. The PMSM drive 30 receives the processed command (driving signal) and produces the driving electrical power. Normally (the PMSM drive 30 works properly), the hub controller 20 switches the driving electrical power to the ACPM 40 so that the ACPM 40 impels the blade 10 to the corresponding blade pitch according to the pitch command 14 through the reduction gear box 50. When the PMSM drive 30 fails or the external electrical power is interrupted, the hub controller 20 switches the uninterruptible electrical power to the ACPM 40 and controls the blade 10 toward a feathered position (a pitch angle where the captured wind energy is minimized) through the ACPM 40 and the reduction gear box 50.

The UPS 60 can be an offline UPS or online UPS and output an AC three-phase electrical power. As mentioned above, the PMSM drive 30, the ACPM 40 and the reduction gear box 50 correspond to the same blade 10. However, the UPS 60 provide uninterruptible electrical power to not only one ACPM 40, but other ACPMs (not shown in the figures) in a wind-driven generator. In other words, the UPS 60 may correspond to one ACPM 40 like FIG. 4 or more ACPMs. Hence, the total cost of one wind-driven generator is reduced and the redundancy requirement is met. As shown in FIG. 4, a position sensor 44, a brake 45 and a limit switch 46 are further disposed on a rotation shaft 41 of the ACPM 40. The embodiment of the position sensor 44 can be, but not limited to, an optical encoder. The position sensor 44 senses the current pitch angle of the blade 10. When the blade 10 reaches the feathered position, the limit switch 46 is triggered. The hub controller 20 receives the triggering signal form the limit switch 46 and then actuates the brake 45 to fix the blade 10.

The reduction gear box 50 is coupled with the rotation shaft 41 of the ACPM 40 for driving the blade 10 to change the pitch angle of the blade.

The UPS 60 is an offline UPS and the uninterruptible electrical power is a three-phase AC power. When the PMSM drive 30 fails or the external electrical power is interrupted, the hub controller 20 switches the three-phase AC power to the ACPM 40 through an AC bus for impelling the blade 10 toward the feathered position.

As depicted previously, the ACPM 40 comprises a PMSM, an induction motor (IM) and a common rotation shaft 41, referring to FIG. 2A-2D. The PMSM receives the external electrical power and produces the rotary power to the common rotation shaft 41. The IM receives the uninterruptible electrical power and produces the rotary power to the common rotation shaft 41. Regarding the structure of the ACPM 40, please refer to FIG. 2A to 2D and related description above.

Through the redundancy design of the blade pitch driving apparatus of the invention, when the PMSM driver 30 fails or the input power supply of the PMSM driver 30 (the external electrical power) is interrupted, the hub controller 20 makes the output end of the PMSM driver 30 separate from the ACPM 40 driven by the PMSM drive 30. In one embodiment, a firs relay 31 controlled by the hub controller 20 is disposed on the output end of the PMSM drive 30. The AC bus is directly connected to the ACPM 40. In one embodiment, a second relay 32 controlled by the hub controller 20 is disposed between the AC bus and the ACPM 40. The three-phase AC power supply provided by the offline UPS 60 is used to directly drive the ACPM 40 to operate, such that the blade 10 rotate towards the feathered position for being shut down. When the blade 10 reaches the feathered position (usually 90° pitch angle), a limit switch 46 is triggered. Upon the triggering signal from the limit switch 46, the hub controller 20 actuates the brake 45 to fix the blade 10, and the AC bus is disconnected from the ACPM 40. Thus the blade 10 is shut down and waits for reparation.

Figure 5:
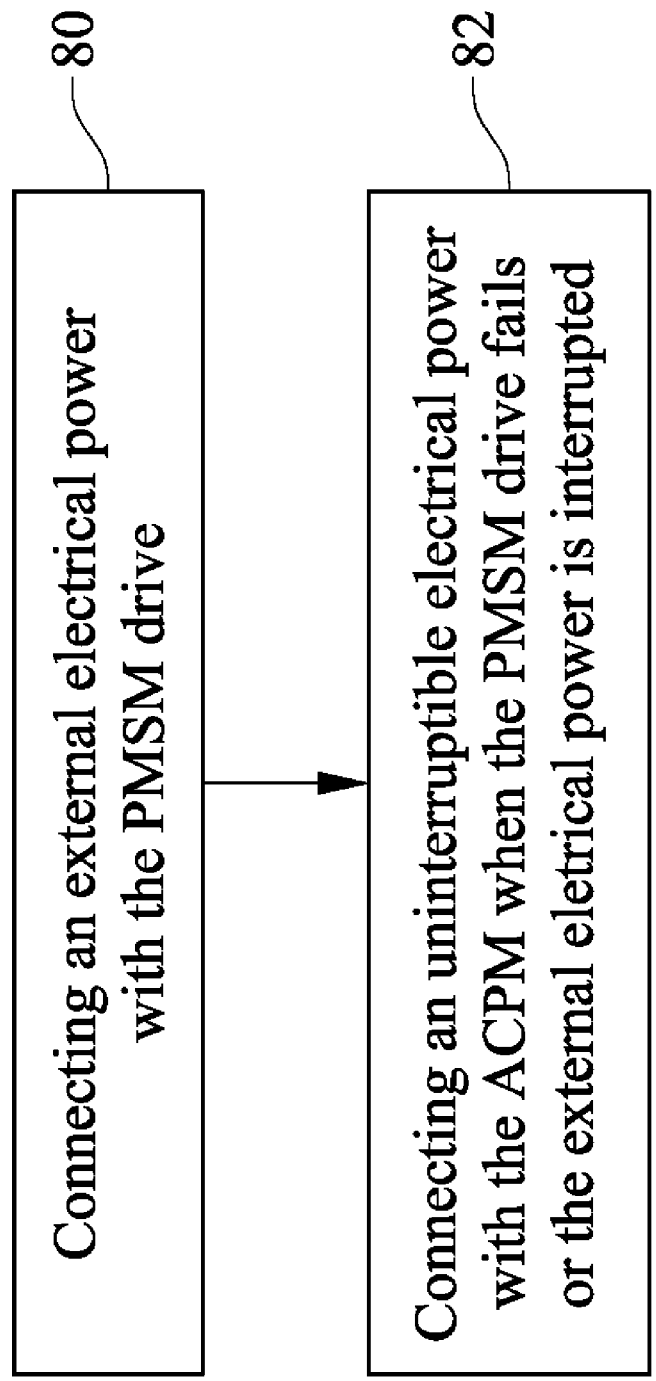
FIG. 5 is a blade pitch driving method of a wind driven generator according to another embodiment of the present invention.

According to another embodiment of the present invention, please refer to FIG. 5 which is the blade pitch driving method of a wind driven generator. The wind driven generator comprises a permanent magnet synchronous motor drive (PMSM drive), an alternating current pitch motor (ACPM). The blade pitch driving method comprises the steps of:

Step 80: connecting an external electrical power with the PMSM drive, so that the ACPM impels the blade toward a predetermined pitch angle; and Step 82: connecting an uninterruptible electrical power with the ACPM to impel the blade toward a feathered position when the PMSM drive fails or the external electrical power is interrupted.

The driving method further comprises the step of disconnecting the external electrical power from the PMSM drive when the PMSM drive fails or the external electrical power is interrupted. As a result, when the PMSM drive fails or the external electrical power is interrupted, the connection between the PMSM and the ACPM is disconnected and the uninterruptible electrical power supply electrical power to the PMSM.

What is claimed is:

1. A blade pitch driving apparatus for a wind-driven generator, the apparatus receiving an external electrical power and impelling a corresponding blade to a corresponding pitch angle, the apparatus comprising:
   an uninterruptible power supply (UPS), providing an uninterruptible electrical power;
   a permanent magnet synchronous motor drive (PMSM drive), electrically connected to the external electrical power to generate a driving electrical power;
   an alternating current pitch motor (ACPM), selectively and electrically connected to either the UPS or the PMSM drive, for generating a rotary power;
   a reduction gear box, coupled with a rotation shaft of the ACPM, for impelling the blade to change the pitch angle of the blade; and
   a hub controller, electrically connected to the PMSM drive and the ACPM, wherein the hub controller switches the PMSM drive to be electrically connected to the ACPM during a normal condition, and when the PMSM drive fails or the external electrical power is interrupted, the hub controller switches the UPS to be electrically connected to the ACPM.

2. The blade pitch driving apparatus for a wind-driven generator as claimed in claim 1, wherein the ACPM comprises a PMSM, an induction motor (IM) and a common rotation shaft, the PMSM receives the external electrical power and produces the rotary power to the common rotation shaft, the IM receives the uninterruptible electrical power and produces the rotary power to the common rotation shaft.

3. The blade pitch driving apparatus for a wind-driven generator as claimed in claim 2, wherein the PMSM and the IM has respective rotors and respective coils.

4. The blade pitch driving apparatus for a wind-driven generator as claimed in claim 2, wherein the PMSM and the IM have respective rotors and a common coil.

5. The blade pitch driving apparatus for a wind-driven generator as claimed in claim 1, wherein the ACPM comprises a rotation shaft, an ACPM rotor around the rotation shaft and a coil around the ACPM rotor.

6. The blade pitch driving apparatus for a wind-driven generator as claimed in claim 5, wherein the ACPM rotor comprises a permanent magnet around the rotation shaft and a plurality of short circuit conductors around the permanent magnet.

7. The blade pitch driving apparatus for a wind-driven generator as claimed in claim 1, further comprising a first relay, disposed on an output end of the PMSM drive and controlled by the hub controller, when the PMSM drive fails, the hub controller disconnects the PMSM drive from the ACPM through the first relay.

8. The blade pitch driving apparatus for a wind-driven generator as claimed in claim 1, wherein the hub controller controls the blade toward a feathered pitch angle through the ACPM and the reduction gear box when the PMSM drive fails or the external electrical power is interrupted.

9. The blade pitch driving apparatus for a wind-driven generator as claimed in claim 7, wherein the UPS is a offline UPS and the uninterruptible electrical power is a three-phase AC power, and when the PMSM drive fails or the external electrical power is interrupted, the hub controller switches the three-phase AC power to the ACPM through an AC bus for impelling the blade toward a feathered position.

10. The blade pitch driving apparatus for a wind-driven generator as claimed in claim 9, further comprising a second relay disposed between the AC bus and the ACPM, the hub controller switching the three-phase AC power to the ACPM through the second relay.

11. The blade pitch driving apparatus for a wind-driven generator as claimed in claim 10, further comprising a position sensor, a brake, and a limit switch disposed on the rotation shaft of the ACPM, the position sensor sensing the current pitch angle of the blade, wherein when the blade reaches the feathered position, the limit switch is triggered, such that the hub controller actuates the brake to fix the blade, and disconnects the AC bus from the ACPM through the second relay.

12. A blade pitch driving method for a wind-driven generator, the wind-driven generator including a blade pitch driving apparatus for impelling a blade to rotate, the apparatus including a permanent magnet synchronous motor drive (PMSM drive), an alternating current pitch motor (ACPM), the driving method comprising the steps of:
   connecting an external electrical power with the PMSM drive, so that the ACPM impels the blade toward a predetermined pitch angle; and
   connecting an uninterruptible electrical power with the ACPM to impel the blade toward a feathered position when the PMSM drive fails or the external electrical power is interrupted.

13. The blade pitch driving method as claimed in claim 12, further comprising:
   disconnecting the external electrical power from the PMSM drive when the PMSM drive fails or the external electrical power is interrupted.

* * * * *